United States Patent
Tsai et al.

(10) Patent No.: US 7,301,248 B2
(45) Date of Patent: Nov. 27, 2007

(54) CONTROL METHOD FOR VOLTAGE BOOSTING CIRCUIT

(75) Inventors: Wen-Che Tsai, Taoyuan Hsien (TW); Jen-Chuan Liao, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 84 days.

(21) Appl. No.: 11/251,697

(22) Filed: Oct. 17, 2005

(65) Prior Publication Data

US 2006/0198169 A1    Sep. 7, 2006

(30) Foreign Application Priority Data

Mar. 7, 2005    (TW) .............................. 94106844 A

(51) Int. Cl.
*H02J 7/00* (2006.01)
(52) U.S. Cl. ............................ 307/66; 307/64; 307/80; 363/35; 363/37
(58) Field of Classification Search ............ 363/97–98, 363/132, 17, 20, 86, 142, 143, 37, 55; 323/205, 323/207; 307/66, 64, 87
See application file for complete search history.

(56) References Cited

U.S. PATENT DOCUMENTS

| | | | | |
|---|---|---|---|---|
| 5,458,991 A | * | 10/1995 | Severinsky | .................. 429/61 |
| 5,737,208 A | * | 4/1998 | Chen | .......................... 363/133 |
| 5,978,236 A | * | 11/1999 | Faberman et al. | ............ 363/37 |

* cited by examiner

*Primary Examiner*—Rajnikant B. Patel

(57) ABSTRACT

A control method for a voltage boosting circuit adapted to be used in an uninterruptible power supply is proposed. The uninterruptible power supply includes a battery module and a voltage boosting circuit comprising a plurality of switch elements, in which the uninterruptible power supply is operating under a battery supply mode. The control method includes the following steps: detecting an output voltage of the battery module and a regulated predetermined output voltage of the voltage boosting circuit; and when the output voltage of the battery module is higher than the regulated predetermined output voltage of the voltage boosting circuit, sending a switching signal to regulate the switching operation of the switch elements of the voltage boosting circuit, so that the output voltage of the voltage boosting circuit is substantially equal to the output voltage of the battery module.

10 Claims, 8 Drawing Sheets

CONTROL METHOD FOR VOLTAGE BOOSTING CIRCUIT

FIELD OF THE INVENTION

The present invention is related to a control method, and more particularly to a control method for a voltage boosting circuit adapted to be used in an uninterruptible power supply.

BACKGROUND OF THE INVENTION

Uninterruptible power supply (or UPS) is an emergent power supply device connected between a commercial power supply and a load. The UPS is set to supply the electricity required to power a load in order to ensure the normal operation of the load when the commercial power supply is operating abnormally.

In order to protect important electronic device with efficiency and reliability, UPS has been widely applied to a variety of electronic circuits to ensure the normal operation of the electronic circuits. The current UPS can be roughly classified into three categories: on-line UPS, line-interactive UPS, and off-line UPS.

Referring to FIG. 1(a), a circuit block diagram of a prior art on-line UPS is shown. As shown in FIG. 1(a), the on-line UPS 10 is used to supply electricity to power a load 11 and includes an AC/DC converter 101, a DC/DC converter 102, a DC/AC converter 103, switch elements 104 and 105, a battery module 106, a control circuit 107, a bypass circuit 108, and a charging circuit 109.

The AC/DC converter 101 is used to receive a commercial AC voltage Vin and convert the commercial AC voltage Vin into a DC voltage. The charging circuit 109 is electrically connected to the AC/DC converter 101 for receiving the DC voltage outputted from the AC/DC converter 101 and converting the received DC voltage into a DC voltage required by the battery module 106 so as to charge the battery module 106. The switch elements 104 and 105 as well as the DC/DC converter 102 are under the control of the control circuit 107, which is used to detect the commercial AC voltage Vin and the output voltage of the battery module 106 in order to control the ON/OFF status of the switch elements 104 and 105.

When the internal circuits of the on-line UPS 10 are malfunctioned to supply electricity required by the load 11, the bypass circuit 108 is activated. Under this condition, the control circuit 107 switches the power delivery route from the switch element 104 to the bypass circuit 108 to allow the commercial power supply to provide required electricity to the load 11.

Referring to FIGS. 1(b) and 1(c), a partial circuit diagram of a prior art dual DC-output half-bridge single-phase on-line UPS and a partial circuit diagram of a prior art three-phase on-line UPS are shown. As shown in these diagrams, when the commercial power supply is supplying electricity normally (or called AC mode), the AC/DC converter 101 first rectifies the commercial AC voltage Vin into a rectified DC voltage, and the dual-output step-up DC/DC converter 102 boosts the rectified DC voltage and regulates the boosted DC voltage. Eventually, the DC/AC converter 103 converts the boosted DC voltage into an AC voltage Vout and transmits the AC voltage Vout to the load 11 (as shown in FIG. 1(a)).

The DC/DC converter 102 is set to boost the voltage level of the DC voltage outputted from the AC/DC converter 101 by means of the switching frequency of the internal switch elements S1 and S2. Referring to FIG. 1(d), a control timing diagram of the switch elements S1 and S2 is shown. As can be understood from the timing diagram of FIG. 1(d), the switch elements S1 and S2 are manipulated by way of alternate switching under the AC mode, and the switching frequency of the switch elements S1 and S2 is set to a high frequency. As can be understood from the depiction of the timing diagram, the switch element S2 will be OFF and the switch element S1 will repetitively turn on and off by way of high-frequency switching within the period T1. On the contrary, the switch S1 will be OFF and the switch element S2 will repetitively turn on and off by way of high-frequency switching within the period T2. Therefore, the DC voltage outputted from the battery module 106 to the DC/DC converter 102 can be boosted by the high-frequency alternate switching of the switch elements S1 and S2.

On the other hand, when the commercial power supply can not supply electricity normally (or called DC mode), the DC voltage $V_{BAT}$ outputted from the battery module 106 is boosted by the DC/DC converter 102. Next, the boosted DC voltage of the DC/DC converter 102 is transmitted to DC/AC converter 103 and converted by the DC/AC converter 103 into an output AC voltage Vout. Finally, the output AC voltage Vout is provided to the load 11 through the switch element 104.

Referring again to FIG. 1(d), the switch elements S1 and S1 are also manipulated by way of high-frequency switching. As shown in FIG. 1(d), the switch element S2 will be ON and the switch element S1 will repetitively turn on and off by way of high-frequency switching within the period of T1. On the contrary, the switch element S1 will be ON and the switch element S2 will repetitively turn on and off by way of high-frequency switching within the period of T2. Therefore, the DC voltage outputted from the battery module 106 to the DC/DC converter 102 can be boosted by way of high-frequency alternate switching of the switch elements S1 and S2. However, such high-frequency switching mechanism is feasible on the condition that the regulated predetermined value of the DC voltage across the positive DC side P1 and the negative DC side P2 of the DC/DC converter 102 is higher than the output voltage $V_{BAT}$ of the battery module 106.

Accordingly, when the aforementioned circuit is employed to the application where a lower output DC voltage and a higher battery voltage are required, the aforementioned prior art switching regulation mechanism will become infeasible. For example, when the DC voltage required by the load 11 is 120V and the battery module 106 contains 12 serially-connected batteries each supply a 12V DC voltage, the DC voltage across the DC sides of the DC/DC converter 102 is set to ±220V according to the output voltage of the power supply and the optimized conversion efficiency, and the output voltage $V_{BAT}$ of the battery module 106 is 144V. According to the switching regulation mechanism implied in the timing diagram of FIG. 1(d), the output voltage $V_{BAT}$ (=144V) of the battery module 106 is boosted to ±220V. That is, the output voltage $V_{DC+}$ at the positive DC side P1 of the DC/DC converter 102 is 220V, and the output voltage $V_{DC-}$ at the negative DC side P2 of the DC/DC converter 102 is −220V. The output voltages $V_{DC+}$ and $V_{DC-}$ across the positive DC side P1 and the negative DC side P2 of the DC/DC converter 102 are converted by the DC/AC converter 103 into a 120V AC voltage which is to be provided to the load 11.

When the DC voltage required by the load 11 is 220V and the battery module 106 contains 20 serially-connected batteries each supply a 12V DC voltage, the DC voltage across the DC side of the DC/DC converter 102 is set to ±360V according to the output voltage of the power supply and the optimized conversion efficiency, and the output voltage $V_{BAT}$ of the battery module 106 is 240V. According to the high-frequency switching regulation mechanism implied in the timing diagram of FIG. 1(d), the output voltage $V_{BAT}$ (=240V) of the battery module 106 is boosted to ±360V. That is, the output voltage $V_{DC+}$ at the positive DC side P1 of the DC/DC converter 102 is 360V, and the output voltage $V_{DC-}$ at the negative DC side P2 of the DC/DC converter 102 is −360V. The output voltages $V_{DC+}$ and $V_{DC-}$ across the positive DC side P1 and the negative DC side P2 of the DC/DC converter 102 are converted by the DC/AC converter 103 into a 220V AC voltage which is to be provided to the load 11.

Because the switch elements S1 and S2 of the DC/DC converter 102 are manipulated by way of high-frequency switching under the DC mode, both of the output voltages $V_{DC+}$ and $V_{DC-}$ across the positive DC side P1 and the negative DC side P2 of the DC/DC converter 102 will be higher than the output voltage $V_{BAT}$ of the battery module 106. Therefore, when the load 11 required a lower voltage, that is, the regulated predetermined value of the DC voltage across the positive DC side and the negative DC side of the DC/DC converter 102 is required to be lower than the output voltage $V_{BAT}$ of the battery module 106, the prior art UPS can not meet such requirement. For example, when the load 11 requires 120V AC voltage and the battery module 106 contains 20 serially-connected batteries, the DC voltage across the DC side of the DC/DC converter 102 is set to ±220V according to the specified output voltage of the power supply and the optimized conversion efficiency. However, both of the output voltages $V_{DC+}$ and $V_{DC-}$ of the prior art dual-output step-up DC/DC converter 102 are bound to be higher than the output voltage $V_{BAT}$ of the battery module 106, and thus the output voltage $V_{BAT}$ (=240V) of the battery module 106 has to be boosted to a higher DC voltage level so that the output DC voltage of the DC/DC converter 102 can be converted to 120V AC voltage which is to be provided to the load 11. However, such switching regulation mechanism has worse conversion efficiency, and the electrolytic capacitors located at the output side of the DC/DC converters require higher voltage durability.

More disadvantageously, the switching operation of the switch elements S1 and S2 of the DC/DC converter 102 is achieved by high-frequency pulse-width modulation, and thus its switching loss will be aggravated and the overall power efficiency is deteriorated.

As a result, there is an urgent need to develop a control method for a voltage boosting circuit in order to address the disadvantages lingered in the prior art.

SUMMARY OF THE INVENTION

The major object of the present invention is set to provide a control method for a voltage boosting circuit that enables the output voltage of the DC/DC converter to be substantially equal to the output voltage of the battery module by regulating the switching frequency of the switch elements of the DC/DC converter. Using the inventive control method to the application of an uninterruptible power supply where a lower output voltage of a DC/DC converter and a higher battery voltage are required, the drawback that the output voltage of the DC/DC converter is higher than the output voltage of the battery module when the DC/DC converter is operating under the DC mode and the switch elements of the DC/DC converter is switching at a high frequency can be removed, so that the switching loss can be reduced and the overall conversion efficiency can be improved.

To this end, a broader aspect of the present invention proposes a control method for a voltage boosting circuit adapted to be used in an uninterruptible power supply which is operating under the DC mode, wherein the uninterruptible power supply includes a battery module and a voltage boosting circuit having a plurality of switch elements. The control method includes the steps of: detecting an output voltage of the battery module and a regulated predetermined output voltage of the voltage boosting circuit; when the output voltage of the battery module is lower than the regulated predetermined output voltage of the voltage boosting circuit, sending a first switching signal to regulate the switching operation of the switch elements of the voltage boosting circuit; and when the output voltage of the battery module is higher than the regulated predetermined output voltage of the voltage boosting circuit, sending a second switching signal to regulate the switching operation of the switch elements of the voltage boosting circuit, so that the output voltage of the voltage boosting circuit is substantially equal to the output voltage of the battery module.

In accordance with the present invention, the battery module includes a plurality of batteries.

In accordance with the present invention, the voltage boosting circuit is a dual-output step-up circuit.

In accordance with the present invention, the voltage boosting circuit is a DC/DC converter.

In accordance with the present invention, the first switching signal is a high-frequency switching signal compared to the second switching signal.

In accordance with the present invention, the first switching signal is a low-frequency switching signal compared to the second switching signal.

In accordance with the present invention, the DC/DC converter includes two switch elements.

In accordance with the present invention, the low-frequency switching signal has a switching rate of 240 Hz.

In accordance with the present invention, the uninterruptible power supply is an on-line uninterruptible power supply.

Another broader aspect of the present invention proposes a control method for a voltage boosting circuit used in an uninterruptible power supply which is operating under the DC mode, wherein the uninterruptible power supply includes a battery module and a voltage boosting circuit having a plurality of switch elements. The control method includes the steps of: detecting an output voltage of the battery module and a regulated predetermined output voltage of the voltage boosting circuit; and when the output voltage of the battery module is higher than the regulated predetermined output voltage of the voltage boosting circuit, sending a switching signal to regulate the switching operation of the switch elements of the voltage boosting circuit, so that the output voltage of the voltage boosting circuit is substantially equal to the output voltage of the battery module.

Now the foregoing and other features and advantages of the present invention will be best understood through the following descriptions with reference to the accompanying drawings, wherein:

BRIEF DESCRIPTION OF THE DRAWINGS

FIG. 1(b) is a partial circuit diagram of a prior art dual DC-output half-bridge single-phase on-line UPS with;

DETAILED DESCRIPTION OF THE PREFERRED EMBODIMENT

Several exemplary embodiments embodying the characteristics and advantages of the present invention are intended to be elaborated in the following. It is appreciated that the present invention allows various modifications to be made without departing from the scope of the present invention, and the descriptions and drawings presented herein is used for the purpose of illustration only but is not intended to be exhaustively interpreted as a constraint on the present invention.

Figure 1A:
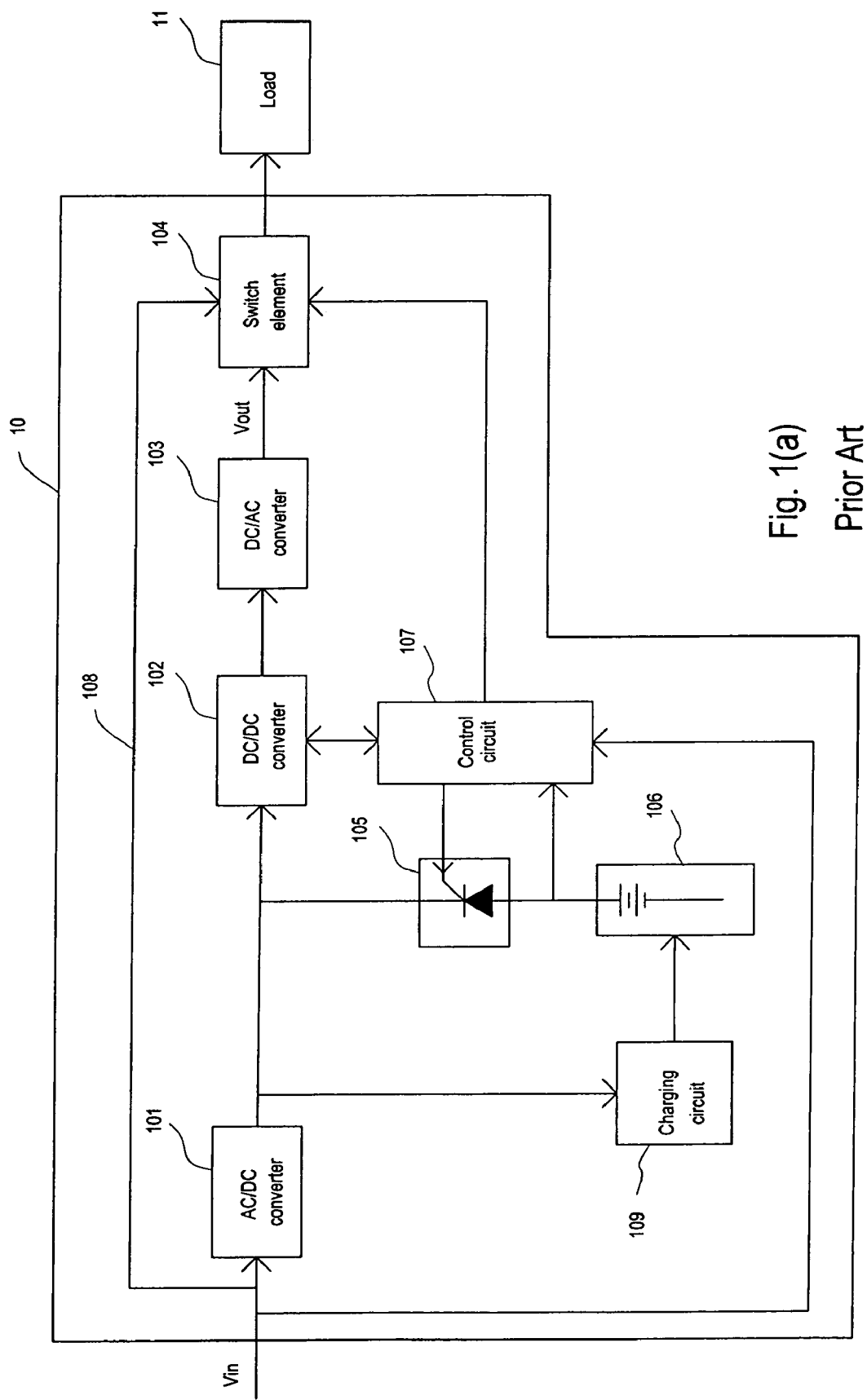
FIG. 1(a) is a circuit diagram showing an on-line UPS system according to the prior art.
Figure 1B:
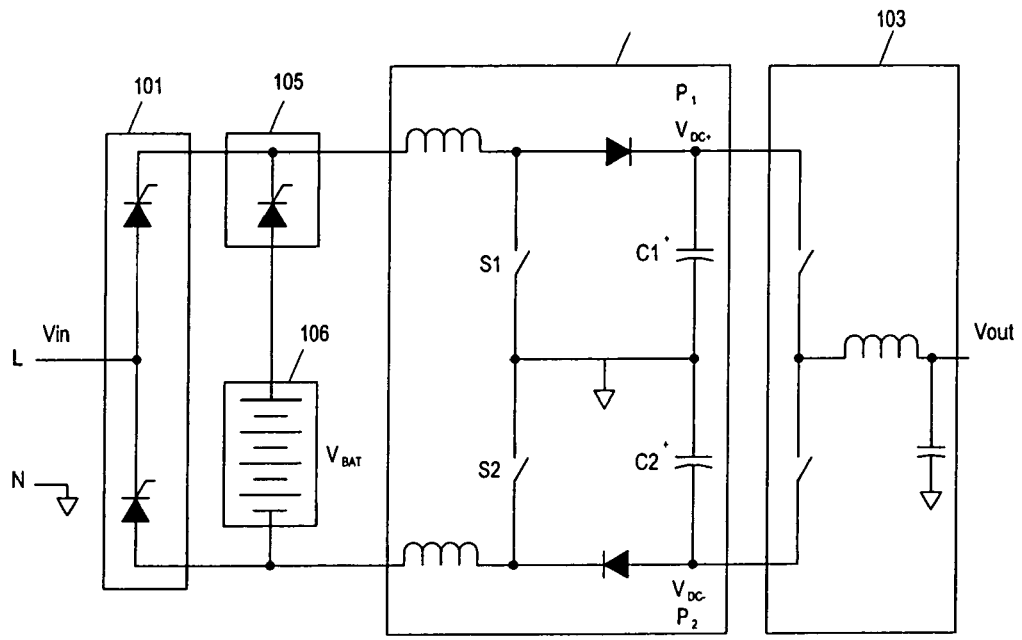
Figure 1C:
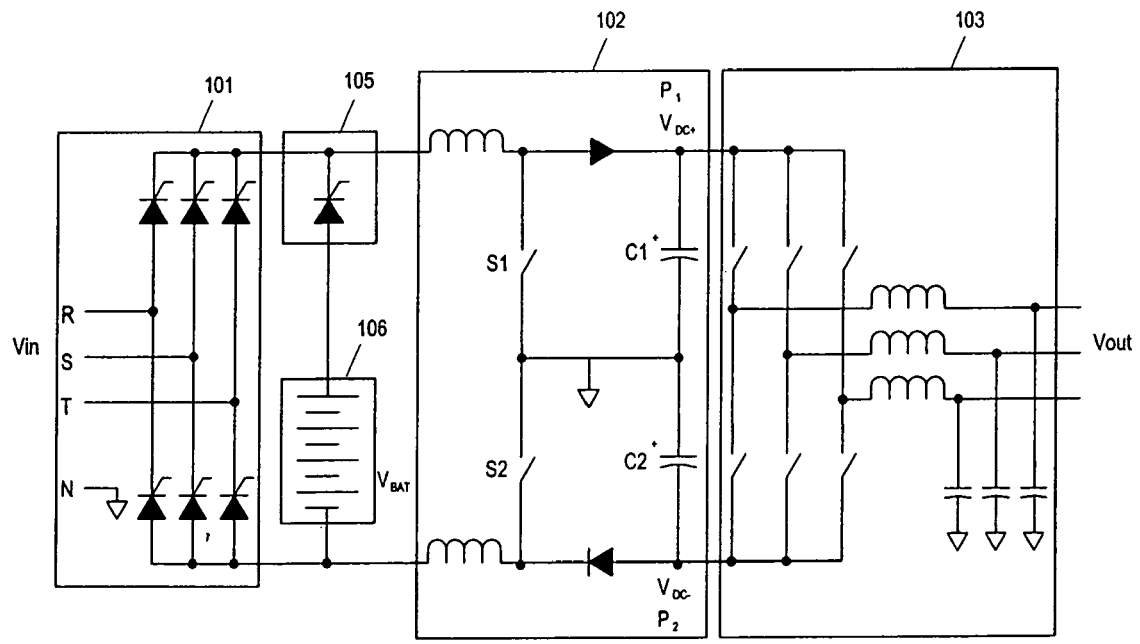
FIG. 1(c) is a partial circuit diagram of a prior art dual DC-output half-bridge three-phase on-line UPS.

Referring again to FIGS. 1(a) to 1(c), the inventive control method is applicable to an uninterruptible power supply (UPS) 10 including a battery module 106, a control circuit 107, and a DC/DC converter 102 having switch elements S1 and S2. The DC/DC converter 102 is a voltage boosting circuit, and more particularly a dual-output step-up circuit. The circuit configuration of the on-line UPS according to a preferred embodiment of the present invention is depicted in FIGS. 1(a) to 1(c), and it is not intended to give details herein.

In the present embodiment, when the commercial power supply connected to the on-line UPS 10 is supplying electricity normally (that is, AC mode), the AC/DC converter 101 first rectifies the commercial AC voltage Vin into a rectified DC voltage and the dual-output step-up DC/DC converter 102 boosts the rectified DC voltage and regulates the boosted DC voltage. Eventually, the DC/AC converter 103 converts the boosted DC voltage into an AC voltage Vout and transmits the AC voltage Vout to the load 11 (as shown in FIG. 1(a)).

Figure 3:
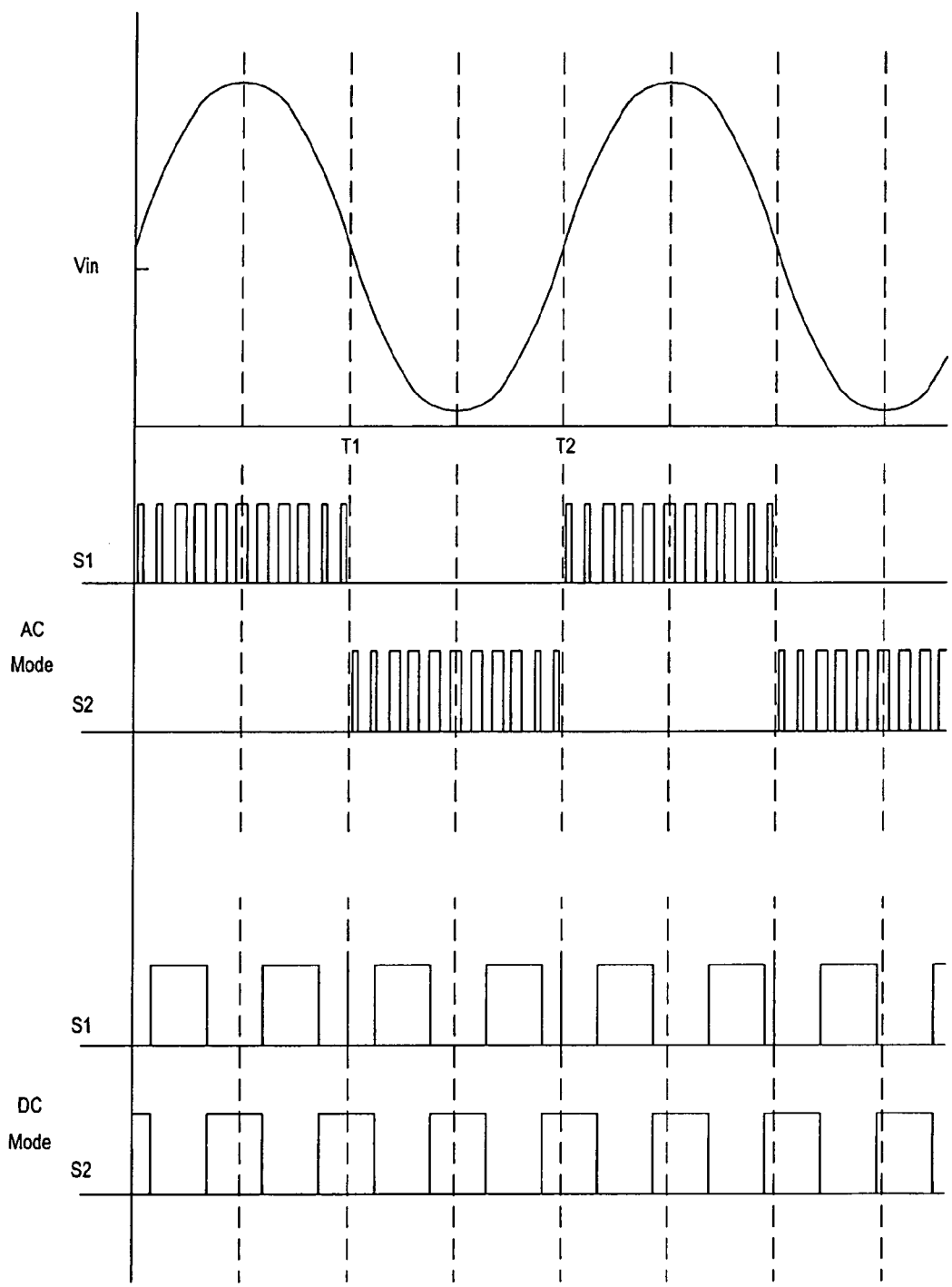
FIG. 3 is a control timing diagram of the switch elements S1 and S2 of the voltage boosting circuit according to a preferred embodiment of the present invention.

The DC/DC converter 102 is set to boost the voltage level of the DC voltage outputted from the AC/DC converter 101 by means of the switching frequency of the internal switch elements S1 and S2. Referring to FIG. 3, a control timing diagram of the switch elements S1 and S2 according to a preferred embodiment of the present invention is shown. As can be understood from the depiction of the timing diagram of FIG. 3, the switch elements S1 and S2 are manipulated by way of alternate switching under the AC mode, and the switching frequency of the switch elements S1 and S2 is set to a high frequency (in the same manner as what depicts in the control timing diagram of FIG. 1(d)). As can be known from the depiction of the timing diagram, the switch element S2 will be OFF and the switch element S1 will repetitively turn on and off by way of high-frequency switching within the period T1. On the contrary, the switch S1 will be OFF and the switch element S2 will repetitively turn on and off by way of high-frequency switching within the period T2. Therefore, the DC voltage outputted from the battery module 106 to the DC/DC converter 102 can be boosted by the high-frequency alternate switching of the switch elements S1 and S2.

Figure 2:
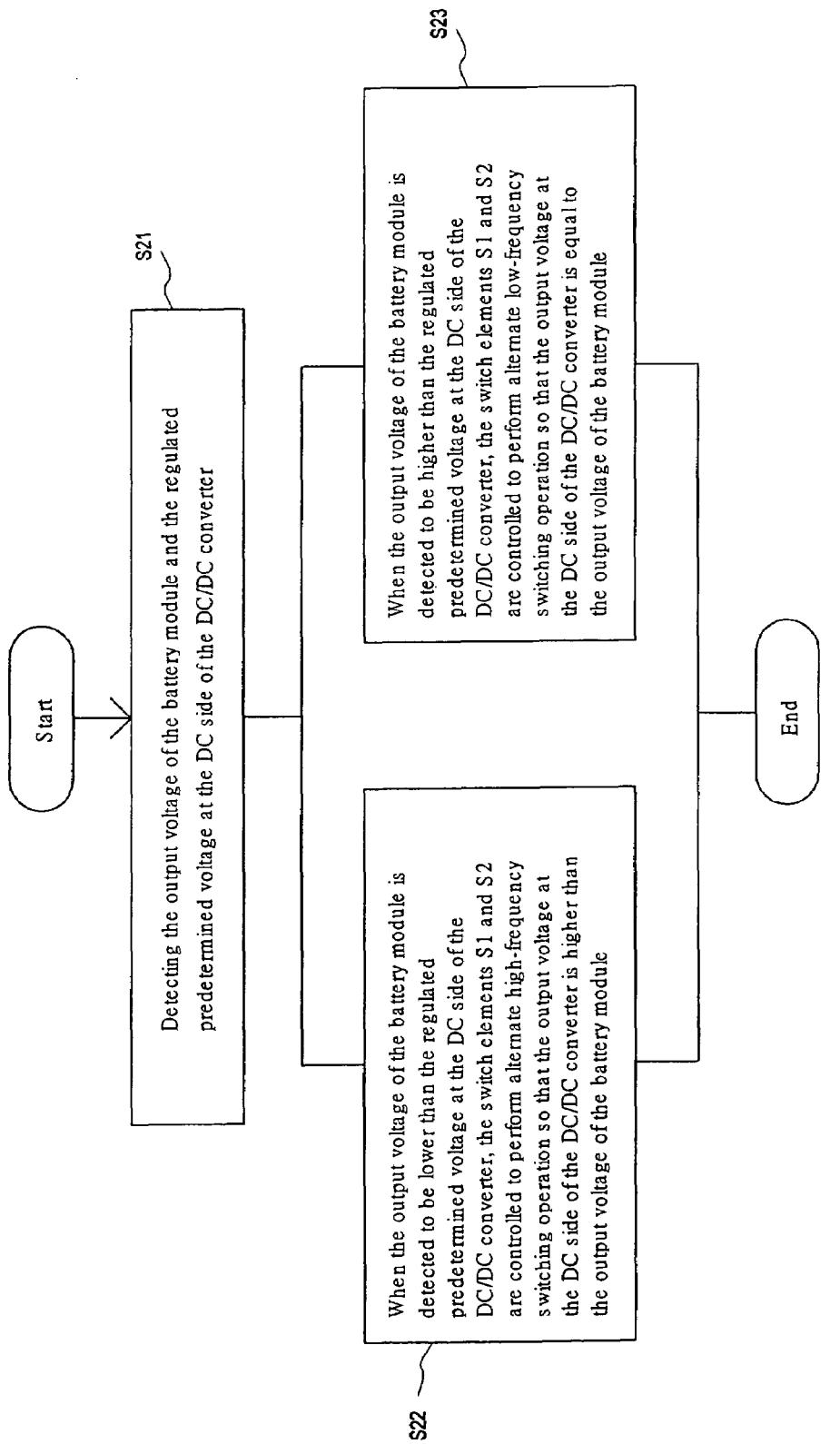
FIG. 2 is a flow chart of the control method for a voltage boosting circuit according to a preferred embodiment of the present invention.

Referring to FIG. 2, a flow chart illustrating the control method according to a preferred embodiment of the present invention is shown. When the commercial power supply can not supply electricity normally, the battery module 106 is set to supply a DC voltage. Under this condition, the UPS 10 switches the power supplying mode from the commercial supply mode to the battery supply mode (or called DC mode). When the on-line UPS 10 is operating under the DC mode, the control method for regulating the internal switch elements S1 and S2 of the DC/DC converter 102 is carried out in virtue of the following steps: First, the DC voltage $V_{BAT}$ outputted from the batteries contained within the battery module 106 and the regulated predetermined voltage at the DC side of the DC/DC converter 102 are detected by the control circuit 107 (step S21).

Figure 1D:
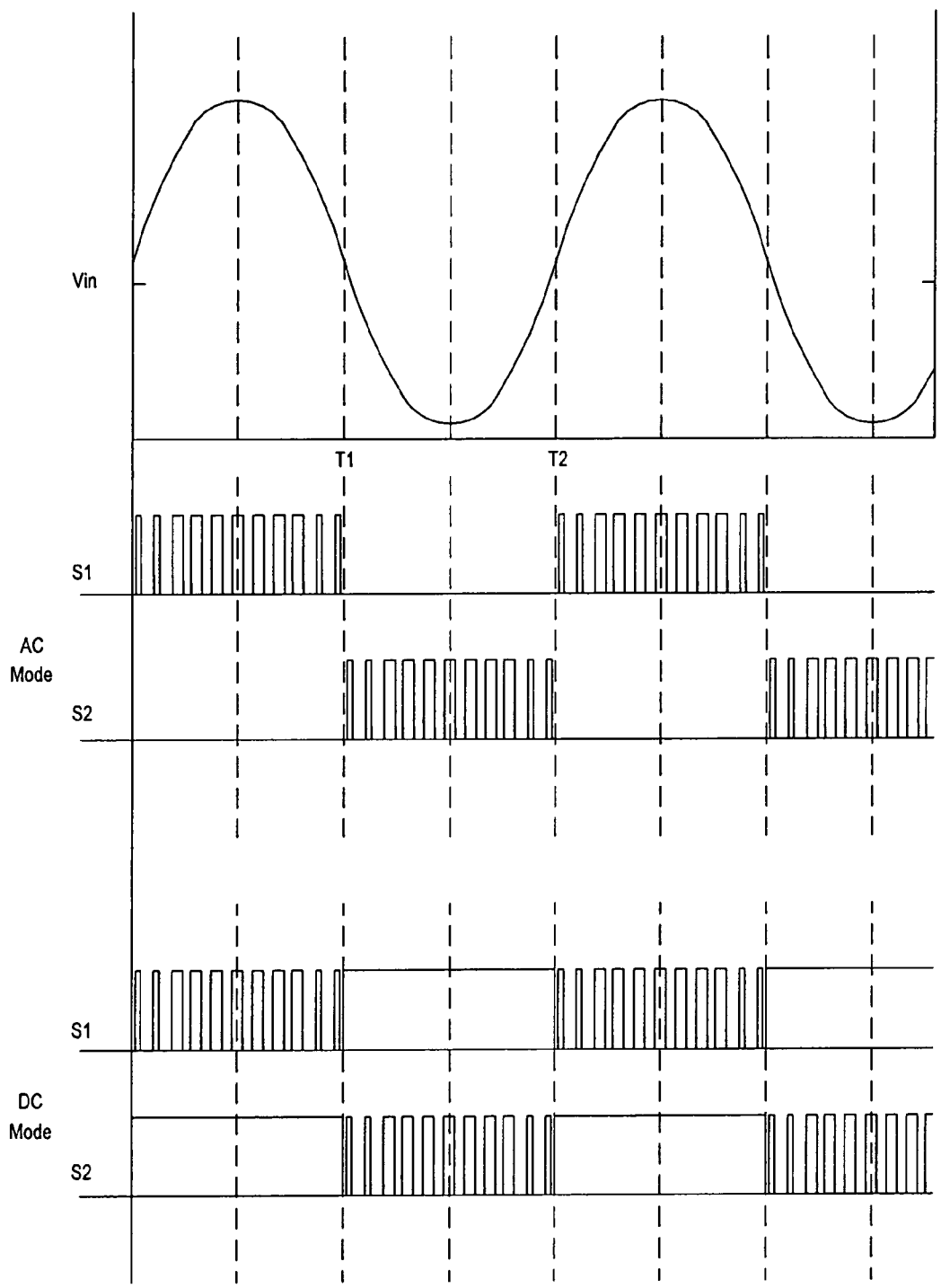
FIG. 1(d) is a control timing diagram of the switch elements S1 and S2 shown in FIGS. 1(b) and 1(c).

Next, the control circuit 107 sends switching signals to regulate the switching frequency of the internal switch elements S1 and S2 of the DC/DC converter 102 according to the detection result obtained at the step S21 to determine the output voltage level of the DC/DC converter 102. If the output voltage $V_{BAT}$ of the battery module 106 is detected to be lower than the regulated predetermined voltage at the DC side of the DC/DC converter 102, the control circuit sends a high-frequency switching signal to the DC/DC converter 102. This operation mode is similar to the DC mode operation discussed with reference to FIG. 1(d). As shown in FIG. 1(d), the switch element S2 will be ON and the switch element S1 will repetitively turn on and off by way of high-frequency switching within the period of T1. On the contrary, the switch element S1 will be ON and the switch element S2 will repetitively turn on and off by way of high-frequency switching within the period of T2. Therefore, the output voltage $V_{BAT}$ of the battery module 106 can be boosted by the DC/DC converter 102 (step S22), and the output voltages $V_{DC+}$ and $V_{DC-}$ across the positive DC side P1 and the negative DC side P2 of the DC/DC converter 102 are converted by the DC/AC converter 103 into an output AC voltage Vout which is to be provided to the load 11.

For example, when the voltage required by the load 11 is a 220V AC voltage and the battery module 106 contains 20 serially-connected batteries each supply a 12V DC voltage, the output voltage $V_{BAT}$ of the battery module 106 will be 240V. According to the DC operation mode implied in FIG. 1(d), the switch elements S1 and S2 of the DC/DC converter 102 uses high-frequency switching to achieve voltage boosting, so that the output voltage $V_{BAT}$ (=240V) of the battery module 106 will be boosted to ±360V DC voltage. That is, the output voltage $V_{DC+}$ at the positive DC side P1 of the DC/DC converter 102 is 360V and the output voltage $V_{DC-}$ at the negative DC side P2 of the DC/DC converter 102 is −360V. The output voltages $V_{DC+}$ and $V_{DC-}$ across the positive DC side P1 and the negative DC side P2 of the DC/DC converter 102 are converted by the DC/AC converter 103 into a 220V AC voltage which is to be provided to the load 11.

On the contrary, when the on-line UPS is intended to be employed to the application where a load 11 requiring a lower output DC voltage or a battery module 106 outputting a higher battery voltage is incorporated, the output voltage $V_{BAT}$ of the battery module 106 will be higher than a regulated predetermined output voltage of the DC/DC converter 102. Therefore, the control circuit 107 uses a voltage-follower control technique to regulate the switch elements S1 and S2 of the DC/DC converter 102. That is, the control circuit 107 sends a low-frequency switching signal to the DC/DC converter 102 to enable the switch elements S1 and S2 to operate by way of alternate switching and control the switch elements S1 and S2 to operate by way of low-frequency switching, as depicted by the DC mode operation implied in FIG. 3. With the alternate low-frequency switching operation of the switch elements S1 and S2, the DC voltage outputted from the battery module 106 to the DC/DC converter 102 will not be boosted so that the output voltages $V_{DC+}$ and $V_{DC-}$ across the positive DC side P1 and the negative DC side P2 of the DC/DC converter 102 will be substantially equal to the battery voltage of the battery module 106 (step S23). Both of the output voltages $V_{DC+}$ and $V_{DC-}$ across the positive DC side P1 and the negative DC side P2 of the DC/DC converter 102 are substantially equal to the output voltage $V_{BAT}$ of the battery module 106 and converted by the DC/AC converter 103 into an AC output voltage which is to be provided to the load 11. This would address the issue of low conversion efficiency of the DC/AC converter 103 and eliminate the need of using electrolytic capacitors with higher voltage durability.

For example, when the voltage required by the load 11 is a 120V AC voltage and the battery module 106 contains 20 serially-connected batteries each supply a 12V DC voltage, the output voltage $V_{BAT}$ of the battery module 106 will be 240V. That is, the output voltage $V_{BAT}$ of the battery module 106 is higher than the regulated predetermined output voltage at the DC side of the DC/DC converter 102, and the switch elements S1 and S2 are manipulated by way of low-frequency switching implied in FIG. 3. As can be understood from FIG. 3, the switch elements S1 and S2 are manipulated by way of alternate switching and the switching frequency for regulating the switch elements S1 and S2 is set to a low frequency. As can be known from the drawings, when the switch element S2 is OFF, the switch element S1 will be always ON instead of repetitively turning on and off under the DC mode as shown in FIG. 1(d). The switch element S1 will be OFF until the switch element S2 is ON. On the contrary, when the switch element S1 is OFF, the switch element S2 will be always ON instead of repetitively turning on and off under the DC mode as shown in FIG. 1(d). The switch element S2 will be OFF until the switch element S1 is ON. Because the switch elements S1 and S2 are manipulated by way of low-frequency switching, both of the output voltages $V_{DC+}$ and $V_{DC-}$ across the DC side of the DC/DC converter 102 are equal to the output battery voltage of the battery module 106. That is, $V_{DC+}$ is 240V and $V_{DC-}$ is −240V. Also, the output voltages $V_{DC+}$ and $V_{DC-}$ across the positive DC side P1 and the negative DC side P2 of the DC/DC converter 102 are converted by the DC/AC converter 103 into a 120V AC voltage which is to be provided to the load 11. Hence, the DC/DC converter 102 has better conversion efficiency, and the electrolytic capacitors placed at the DC side of the DC/DC converter 102 do not need higher voltage durability.

In the present embodiment, the switching rate of the low-frequency switching signal provided to the switch elements S1 and S2 under the DC mode is set to but not absolutely fixed to 240 Hz.

Figure 4A:
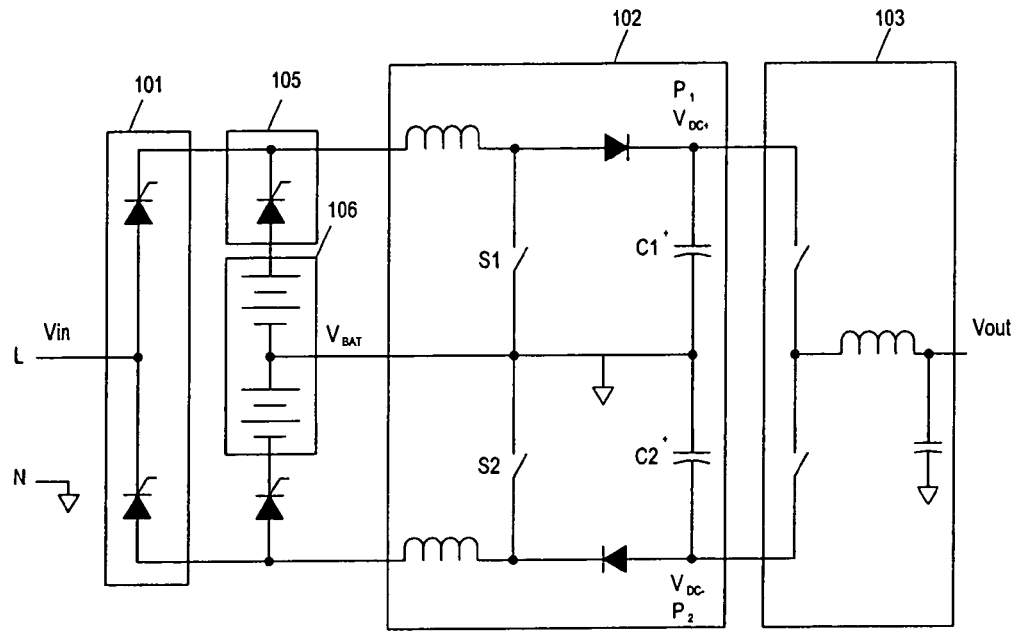
FIG. 4(a) is a partial circuit diagram of a dual-battery half-bridge single-phase on-line UPS.
Figure 4B:
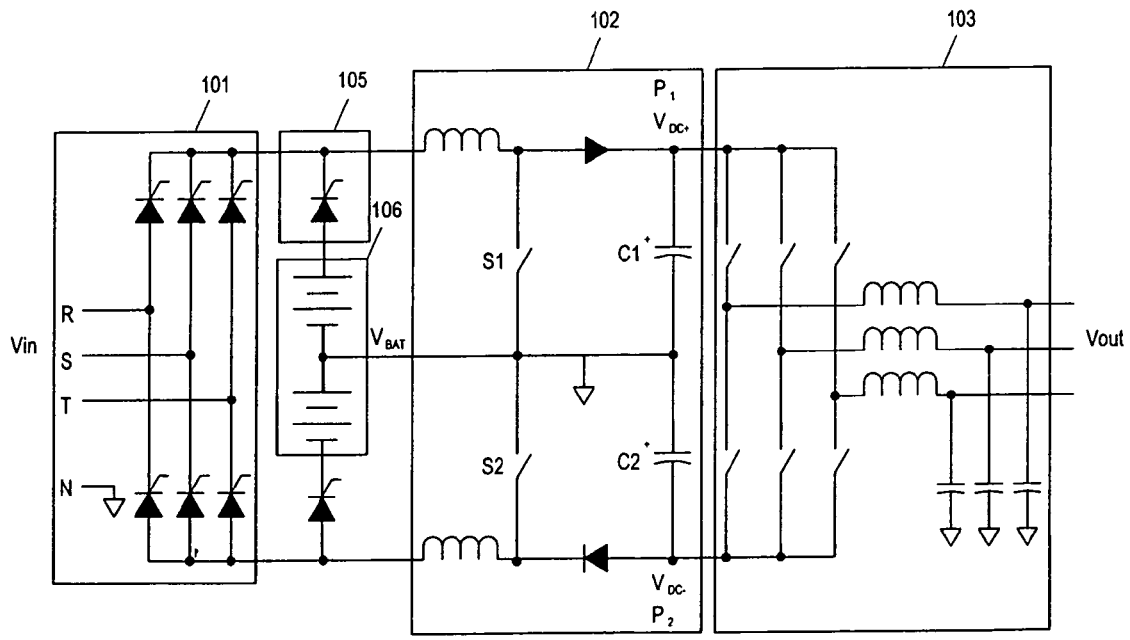
FIG. 4(b) is a partial circuit diagram of a dual-battery half-bridge three-phase on-line UPS.

Referring to FIGS. 4(a) and 4(b), a partial circuit diagram of a dual DC-output dual-battery half-bridge single-phase on-line UPS and a partial circuit diagram of a dual DC-output dual-battery half-bridge three-phase on-line UPS are shown. As shown in FIGS. 4(a) and 4(b), the battery module 106 is comprised of two batteries. As to the principle, function and efficacy of the AC/DC converter 101, DC/DC converter 102, DC/AC converter 103 and the switch element 105 have been dwelled in the first embodiment and the background description, and their explanation is omitted herein for simplicity.

Figure 4C:
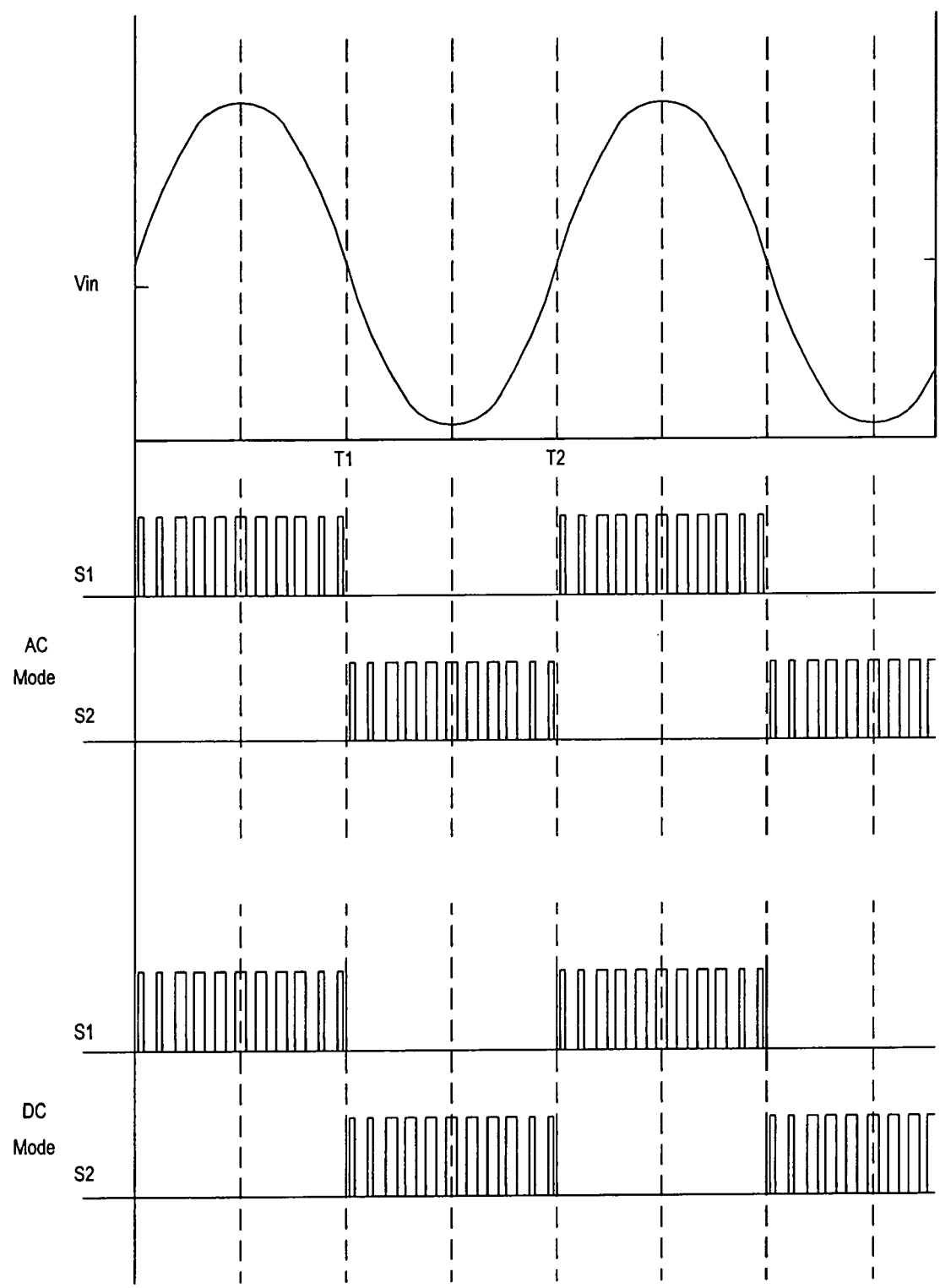
FIG. 4(c) is a control timing diagram of the switch elements S1 and S2 shown in FIGS. 4(a) and 4(b) when an output voltage of a battery module is lower than a regulated predetermined output voltage of a DC/DC converter.

Referring to FIG. 4(c), a control timing diagram of the switch elements S1 and S2 shown in FIGS. 4(a) and 4(b) when an output voltage $V_{BAT}$ of the battery module is lower than a regulated predetermined output voltage of a DC/DC converter is shown. As shown in FIG. 4(c), when the commercial power supply is working normally (or called the AC mode), the switch elements S1 and S2 are manipulated by way of alternate switching under the AC mode, and the switching frequency of the switch elements S1 and S2 is set to a high frequency. As can be understood from the depiction of FIG. 4(c), the switch element S2 will be OFF and the switch element S1 will repetitively turn on and off by way of high-frequency switching within the period T1. On the contrary, the switch S1 will be OFF and the switch element S2 will repetitively turn on and off by way of high-frequency switching within the period T2. Therefore, the DC voltage outputted from the battery module 106 to the DC/DC converter 102 can be boosted by the high-frequency alternate switching of the switch elements S1 and S2.

In case the commercial power supply can not supply electricity normally and the battery module is driven to provide DC voltage (or called DC mode), the switch elements S1 and S2 are also manipulated by way of high-frequency switching. As shown in FIG. 4(c), the switch element S2 will be OFF and the switch element S1 will repetitively turn on and off by way of high-frequency switching within the period T1. On the contrary, the switch S1 will be OFF and the switch element S2 will repetitively turn on and off by way of high-frequency switching within the period T2. Therefore, the DC voltage outputted from the battery module 106 to the DC/DC converter 102 can be boosted by the high-frequency alternate switching of the switch elements S1 and S2.

When the online UPS 10 is operating under the battery supply mode where the load 11 requires a lower DC voltage or the battery module 106 outputs a higher battery module, the output voltage $V_{BAT}$ of the battery module 106 is higher than the regulated predetermined voltage across the positive and negative DC side P1 and P2 of the DC/DC converter 102. In the present embodiment, the control circuit 107 commands the switch element to be always OFF (as depicted by the DC mode operation implied in FIG. 4(c)), so that voltage outputted from the battery module 106 to the DC/DC converter 102 will not undergo voltage transformation, and thus both of the output voltages $V_{DC+}$ and $V_{DC-}$ will be substantially equal to the battery voltage of the battery module 106. In this manner, both of the output voltages $V_{DC+}$ and $V_{DC-}$ at the DC side of the DC/DC converter will be substantially equal to the battery voltage of $V_{BAT}$ of the battery module 106 and will be converted by the DC/AC converter 103 into an output AC voltage Vout which is to be provided to the load 11. This would address the issue of low conversion efficiency of the DC/AC converter 103 and eliminate the need of using electrolytic capacitors with higher voltage durability.

Figure 4D:
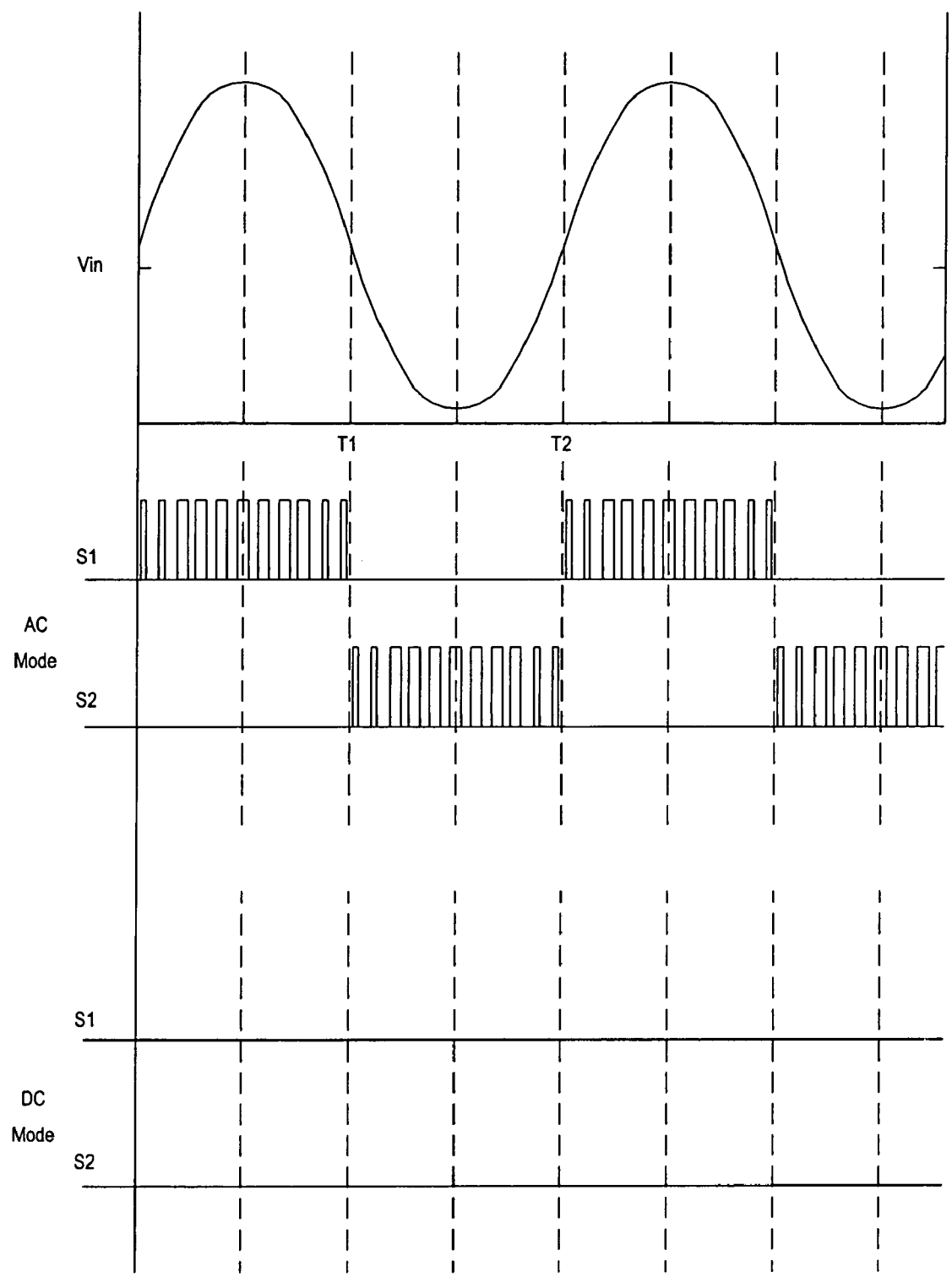
FIG. 4(d) is a control timing diagram of the switch elements S1 and S2 shown in FIGS. 4(a) and 4(b) when an output voltage of a battery module is higher than a regulated predetermined output voltage of a DC/DC converter.

As to the switching operation of the switch elements S1 and S2 when the on-line UPS 10 is operating under the AC mode as implied in FIG. 4(d), it is similar to the switching operation illustrated in FIG. 4(c), and we are not intended to give details herein.

In conclusion, the inventive control method is applicable to the voltage boosting circuit adapted to be used in an uninterruptible power supply. When the output voltage of a battery module within an uninterruptible power supply is higher than a regulated predetermined voltage of a voltage boosting circuit, the inventive control method allows the switching frequency of the internal switch elements S1 and S2 of the DC/DC converter to be changed from a high frequency to a low frequency, so that the output voltage of the DC/DC converter is substantially equal to the output voltage of the battery voltage. Accordingly, the overall conversion efficiency of the DC/AC converter will be enhanced and the usage of the electrolytic capacitors will be more cost-effective.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A control method for a voltage boosting circuit used in an uninterruptible power supply, wherein the uninterruptible power supply comprises a battery module and a voltage boosting circuit having a plurality of switch elements, and is operating under a battery power supply mode, the control method comprises the steps of:
   detecting an output voltage of the battery module and a regulated predetermined output voltage of the voltage boosting circuit;
   when the output voltage of the battery module is lower than the regulated predetermined output voltage of the voltage boosting circuit, sending a first switching signal to regulate the switching operation of the switch elements of the voltage boosting circuit; and
   when the output voltage of the battery module is higher than the regulated predetermined output voltage of the voltage boosting circuit, sending a second switching signal to regulate the switching operation of the switch elements of the voltage boosting circuit, in order that the output voltage of the voltage boosting circuit is substantially equal to the output voltage of the battery module.

2. The control method according to claim 1 wherein the battery module comprises a plurality of batteries.

3. The control method according to claim 1 wherein the voltage boosting circuit is a dual-output step-up circuit.

4. The control method according to claim 1 wherein the voltage boosting circuit is a DC/DC converter.

5. The control method according to claim 4 wherein the DC/DC converter comprises two switch elements.

6. The control method according to claim 1 wherein the first switching signal is a high-frequency switching signal compared to the second switching signal.

7. The control method according to claim 1 wherein the second switching signal is a low-frequency switching signal compared to the first switching signal.

8. The control method according to claim 7 wherein a switching rate of the low-frequency switching signal is 240 Hz.

9. The control method according to claim 1 wherein the uninterruptible power supply is an on-line uninterruptible power supply.

10. A control method for a voltage boosting circuit used in an uninterruptible power supply, wherein the uninterruptible power supply comprises a battery module and a voltage boosting circuit having a plurality of switch elements, and is operating under a battery power supply mode, the control method comprises the steps of:
    detecting an output voltage of the battery module and a regulated predetermined output voltage of the voltage boosting circuit; and
    when the output voltage of the battery module is higher than the regulated predetermined output voltage of the voltage boosting circuit, sending a switching signal to regulate the switching operation of the switch elements of the voltage boosting circuit, in order that the output voltage of the voltage boosting circuit is substantially equal to the output voltage of the battery module.

* * * * *